United States Patent
Barron

(10) Patent No.: US 6,776,026 B1
(45) Date of Patent: Aug. 17, 2004

(54) KNOCK SENSOR

(75) Inventor: Luis F. Barron, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/457,200

(22) Filed: Jun. 9, 2003

(51) Int. Cl.[7] ............................................. G01L 23/22
(52) U.S. Cl. .................................................. 73/35.11
(58) Field of Search ........................ 73/35.11, 35.13, 73/654; 310/329

(56) References Cited

U.S. PATENT DOCUMENTS

| | | | |
|---|---|---|---|
| 4,660,409 A * | 4/1987 | Miyata et al. ............. | 73/35.11 |
| 5,140,962 A | 8/1992 | Iwata ......................... | 123/425 |
| 5,212,421 A | 5/1993 | Hatton et al. ............... | 310/329 |
| 5,398,540 A | 3/1995 | Entenmann et al. ........... | 73/35 |
| 5,744,698 A | 4/1998 | Genot ........................ | 73/35.11 |
| 5,939,616 A | 8/1999 | Ito et al. ................... | 73/35.11 |
| 5,965,804 A | 10/1999 | Sakamoto .................. | 73/35.11 |
| 6,279,381 B1 * | 8/2001 | Brammer et al. .......... | 73/35.11 |
| 6,615,645 B1 | 9/2003 | Butler, Jr. et al. ......... | 73/117.3 |
| 6,615,811 B1 | 9/2003 | Butler, Jr. .................. | 73/35.08 |
| 2003/0005911 A1 | 1/2003 | Subramanian et al. . | 123/406.29 |

* cited by examiner

*Primary Examiner*—John E. Chapman
(74) *Attorney, Agent, or Firm*—Jimmy L. Funke

(57) ABSTRACT

A knock sensor, comprising: a sleeve; a piezoelectric transducer disposed about the sleeve, the piezoelectric transducer being insulated from the sleeve and in electrical communication with a first terminal and a second terminal; wherein the piezoelectric transducer is preloaded by a combination seismic mass and nut configured to threadingly engage a portion of the sleeve and provide a mass to the knock sensor, the combination seismic mass and nut being integrally formed out of the same material.

14 Claims, 2 Drawing Sheets

KNOCK SENSOR

TECHNICAL FIELD

The present disclosure relates to knock sensors, in particular engine knock sensors.

BACKGROUND

Most vehicles today are equipped with numerous sensors that are used to regulate the operation of the engine. One such sensor is an engine knock sensor. Typically, an engine knock sensor is mounted on an engine block, e.g., on the intake manifold or a cylinder head. The knock sensor is adapted to produce an output voltage in proportion to engine vibrations caused by uneven burning of fuel (e.g., engine knock). When engine knock occurs, a microprocessor adapted to receive signals from the knock sensor is also adapted to adjust the engine timing in order to minimize or eliminate the sensed knocking.

Current knock sensors include a piezoelectric element that is preloaded such that the sensor will provide an output voltage in proportion to engine vibrations caused by knock. Typically, the resonant frequency of the sensor is matched to the knock frequency of the engine. If the sensor determines there is an engine knock, a corresponding signal is generated, which is received by the engine control module (ECM) to control the knock by for example, retarding the spark timing of the engine.

A knock sensor 10 of a known construction is illustrated in FIG. 1. Knock sensor 10, comprises a sleeve portion 12, which includes a disc shaped flange portion 14 and a cylinder portion 16 that extends from a center portion of the flange portion. An external thread portion 18 is formed at an upper portion of the cylinder portion.

An assembly of a piezoelectric element 20 disposed between a first contact plate 22 and a second contact plate 24 is positioned on sleeve 12 by being slid over cylinder portion 16. The contacts are insulated to ensure proper operation of the sensor. The insulation is provided by a first layer of insulation 26 and a second layer of insulation 28, which may be positioned in any configuration to ensure insulation of the contact plates and piezoelectric element assembly as well as ensure electrical communication with terminal portions of contact plates 22 and 24, wherein a signal indicative of knock may be generated by the knock sensor. For example, the insulating layers may be disposed between the contact plate and the flange portion or the contact plates and the cylinder portion or combinations thereof. Also, a layer of insulation is provided between the upper contact plate 24 and a seismic mass 30, which is positioned over cylinder portion 16 and adds the required mass to the sensor.

In order to secure the assembly together and provide the necessary pre-load to the piezoelectric element 20 a nut 32 configured to threadingly engage the threaded portion 18 of the cylinder is secured to the cylinder until the nut applies the required pre-load to the piezoelectric element through a spring 34 disposed between the mass and the nut. Once assembled the outer periphery of the sensor is encased in a housing or covering 36, which is configured to encase the sensor in a manner that allows a bolt to pass through the center of the sleeve for securing the same to the engine block. The housing also provides a means for termination of the leads of the two contact plates.

Accordingly, the assembly of the knock sensor described above includes multiple parts and multiple assembly steps. Moreover, the additional parts add to the overall size of the completed sensor. For example, in one assembly process, the first insulating layer 26 is disposed on the sleeve, then the lower contact plate 22, the piezoelectric element 20 and the upper contact plate 24 are disposed on the first insulating layer and the second insulating layer 28 is disposed on the upper contact plate 24, then the mass 30 and spring 34 via application of nut 32 to the sleeve preloads the piezoelectric element 20. Finally, the assembled elements are covered with the cover portion 36. The resulting size of the completed sensor is directly proportional to the number and configuration of the components encased by the housing. In addition, the number of assembly steps is also directly proportional to the number of parts assembled on the sleeve 12.

Accordingly, there is a continuing need to reduce the size of the knock sensor while achieving the same output of a larger sensor.

SUMMARY

A knock sensor having a piezoelectric transducer preloaded by a seismic mass, wherein the seismic mass is configured to threadingly engage a portion of a sleeve of the sensor in order to pre-load the piezoelectric transducer.

A knock sensor, comprising: a sleeve; a piezoelectric transducer disposed about the sleeve, the piezoelectric transducer being insulated from the sleeve and in electrical communication with a first terminal and a second terminal; wherein the piezoelectric transducer is preloaded by a combination seismic mass and nut configured to threadingly engage a portion of the sleeve and provide a mass to the knock sensor, the combination seismic mass and nut being integrally formed out of the same material.

A knock sensor adapted to provide a signal to an engine control module of an engine, the signal corresponding to a knock vibration of the engine, the knock comprising: a sleeve; a piezoelectric transducer disposed about the sleeve, the piezoelectric transducer being insulated from the sleeve and in electrical communication with a first terminal and a second terminal; wherein the piezoelectric transducer is preloaded by a combination seismic mass and nut configured to threadingly engage a portion of the sleeve and provide a mass to the knock sensor, the combination seismic mass and nut being integrally formed out of the same material and either the first terminal and/or the second terminal are in electrical communication with the engine control module.

BRIEF DESCRIPTION OF THE DRAWINGS

The present disclosure will now be described, by way of example, with reference to the accompanying drawings, in which.

DESCRIPTION OF THE EMBODIMENTS

Disclosed herein is a knock sensor that achieves a smaller sized package while having the same output of a larger sized sensor.

Figure 2:
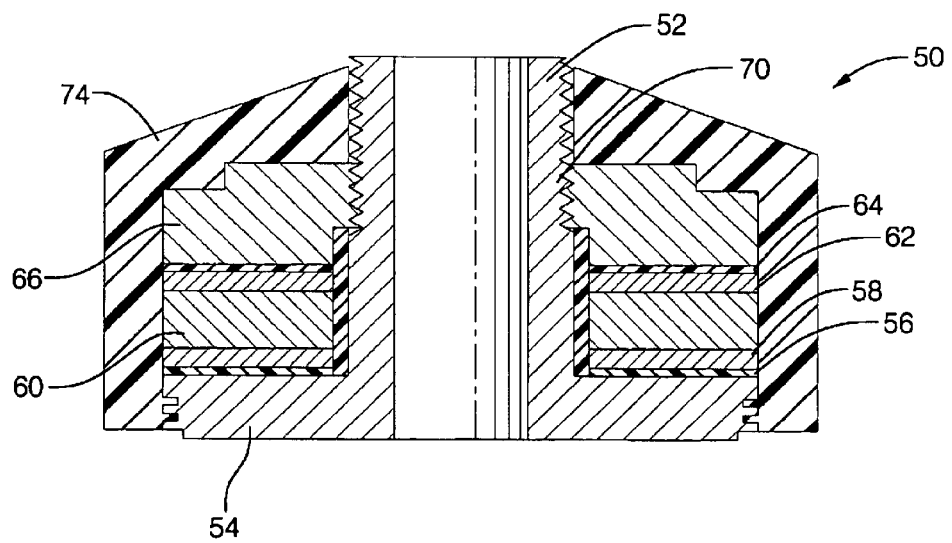
FIG. 2 is a cross sectional view of a knock sensor constructed in accordance with an exemplary embodiment of the present disclosure.

Referring now to FIG. 2, a knock sensor constructed in accordance with the present disclosure is shown and generally designated 50. FIG. 2 illustrates that the knock sensor 50 includes a generally cylindrical hollow sleeve 52 that has a radially enlarged base portion 54.

As illustrated, a generally disk-shaped lower insulator 56 is installed around the sleeve 52 on top of the base 54. In addition, a generally disk-shaped lower terminal 58 is stacked on the lower insulator 56. A piezoelectric transducer 60 is then positioned on top of the lower insulator. A generally disk-shaped upper terminal 62 is disposed around the sleeve on top of the piezoelectric transducer such that the transducer is sandwiched between the terminals 58 and 62. A generally disk-shaped upper insulator 64 is stacked on top of the upper terminal 62.

It is noted, and as illustrated, the central openings of lower insulator 56, lower terminal 58, piezoelectric transducer 60, upper terminal 62 and upper insulator 64 are configured to allow the same to be positioned over and around the cylinder portion of sleeve 52 and each opening or at least the openings of lower terminal 58, piezoelectric transducer 60 and upper terminal 62 are each configured to have an opening which is larger than the exterior dimensions of the cylinder portion of the sleeve. Thus, and when these items with their oversized openings are positioned about the cylinder portion they are capable of being positioned so as to prevent the same from making contact with the cylinder portion. In addition, the insulating layers (56 and 64) also prevent these items from making contact with the cylinder portion.

Figure 3:
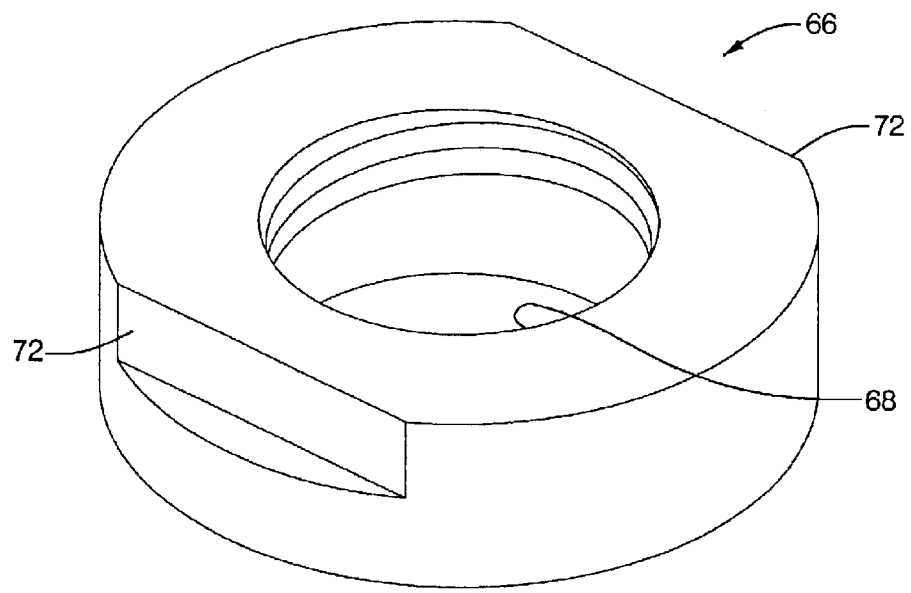
FIG. 3 is a perspective view of a combination nut and seismic mass of the present disclosure.
Figure 4:
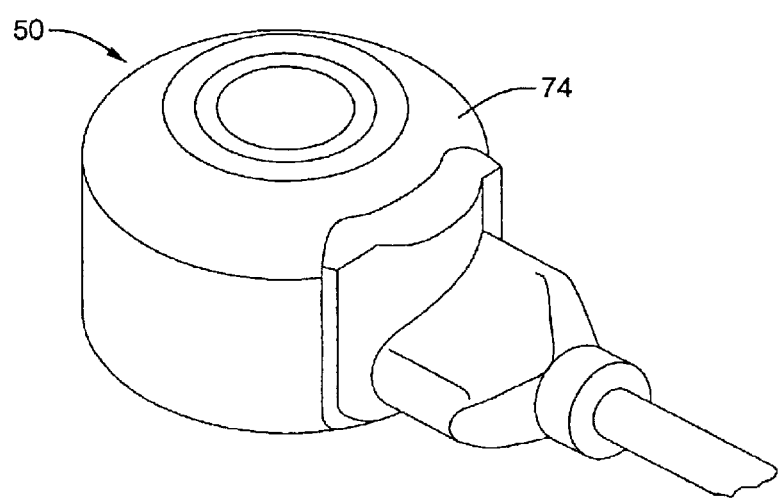
FIG. 4 is a perspective view of an assembled knock sensor.

In accordance with an exemplary embodiment of the present disclosure and referring now to FIGS. 2–4, a load applying component having a mass or a combination seismic mass and nut 66 is secured to the sleeve. Combination seismic mass and nut or load applying component 66 is a unitary item formed out of the same material, wherein the item is configured to threadingly engage a portion of the sleeve to secure the items of the sensor together as well as providing the required mass and pre-load to the piezoelectric transducer. Thus, combination seismic mass and nut 66 comprises both a mass and a nut portion which are integrally formed together. Combination seismic mass and nut 66 provides a dual function of securing lower insulator 56, lower terminal 58, piezoelectric transducer 60, upper terminal 62 and upper insulator 64 to the sleeve and each other as well as providing the necessary mass to sensor in order to induce a voltage signal when a predetermined vibration frequency is sensed by the sensor.

Seismic mass and nut 66 is secured to the sleeve after the lower insulator 56, lower terminal 58, piezoelectric transducer 60, upper terminal 62 and upper insulator 64 are positioned onto the sleeve as illustrated in FIG. 2, wherein a gap is maintained between the inner openings of the lower insulator 56, lower terminal 58, piezoelectric transducer 60, upper terminal 62 and upper insulator 64 and the cylinder portion of the sleeve.

Seismic mass and nut 66 has a central opening 68 that is at least partially threaded to threadingly engage a threaded portion 70 of sleeve 52. Thus, seismic mass and nut 66 provides both the required mass and means (threaded portion) to pre-load the piezoelectric transducer. Accordingly, once the seismic mass and nut 66 is secured to the sleeve the other components are secured in their preferred location and the required pre-load is applied to the piezoelectric transducer.

In addition, there is no requirement for a spring to be disposed between the nut and the mass. Accordingly, and in an exemplary embodiment, the output of the sensor relates to the vibrations encountered by the whole sensor. Thus, the seismic mass provides the required load to the sensor, which will induce a voltage signal when the sensor encounters a frequency vibration corresponding to engine knock. Also, since the nut and the seismic mass are one in the same the overall configuration of the combined element is also reduced.

Figure 1:
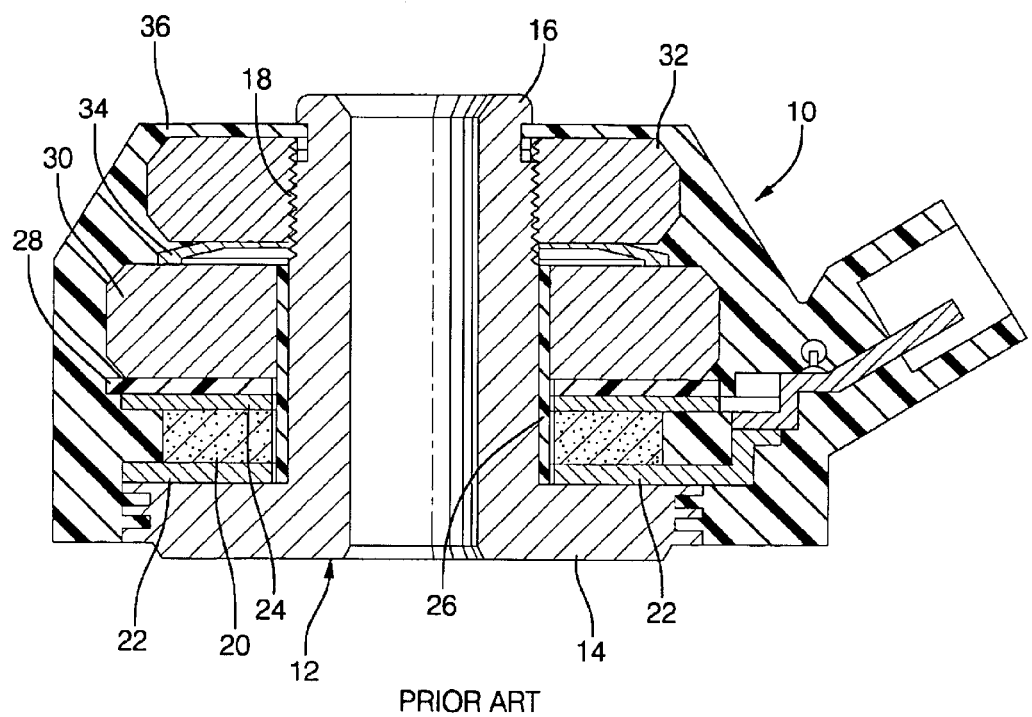
FIG. 1 is a cross sectional view of a knock sensor.

The knock sensor of the present disclosure utilizes a single component, which performs the functions of the separate nut and mass (e.g., FIG. 1). This allows the area typically reserved for the nut to be used as an additional area for the material comprising the seismic mass. In the design of the sensor in FIG. 1 this area is typically kept free to allow for the required tool to tighten the nut upon the mass. Thus, the combined component 66 allows additional area of the sensor to be utilized for the seismic mass. Therefore, the overall size and configuration of sensor 50 is reduced while sensor 50 at the same time provides an output typically restricted to sensors of larger sizes and configurations (e.g., a sensor with a separate nut and mass configuration).

In addition, and referring now to FIG. 3, the outer portion of seismic mass and nut 66 includes features 72, which provide a means for engaging seismic mass and nut 66 with a tool such as a wrench for applying a torque force to seismic mass and nut 66 in order to secure the same to the sleeve while preloading the piezoelectric element Of course, other configurations or features 72 are considered to be within the scope of the present disclosure. For example, the entire upper periphery of the seismic mass and nut 66 may have a hexagon or other shape to provide the engaging surfaces of a tool adapted to provide a torque to seismic mass and nut 66.

After the elements are assembled as described above, and referring now to FIGS. 2–4, a plastic housing 74 is overmolded around the elements of the sensor. The plastic housing 74 protects the interior components from contaminates such as water or other debris that may affect the performance of the sensor. During the overmolding process, the gap between the inner openings of lower insulator 56, lower terminal 58, piezoelectric transducer 60, upper terminal 62 and upper insulator 64 and the outer surface of the cylinder portion of the sleeve is filed with the molten plastic used in the overmolding process.

The assembled sensor of the present disclosure comprises no moving parts. The sensor is secured to an engine and is adapted to provide an output signal wherein a particular frequency vibration (e.g., engine knock) is encountered by the sensor.

In anticipated use the knock sensor is adapted to provide a signal to a microprocessor via electrical line or other equivalent means of communication. In an exemplary embodiment, the microprocessor is an engine control module (ECM), but it is to be appreciated that it can be any type of microprocessor, wherein an ignition system is connected to the microprocessor via the electrical line and when the microprocessor receives a signal from the knock sensor, indicating that the engine is knocking, the ECM sends a signal to the ignition system in order to adjust the engine timing until the knocking is eliminated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present disclosure not be limited to the particular embodiment disclosed as the best mode contemplated for carrying out this invention, but that the invention will include all embodiments falling within the scope of the appended claims. Furthermore, no element, component, or method step in the present disclosure is intended to be dedicated to the public regardless of whether the element, component, or method step is explicitly recited in the claims.

What is claimed is:

1. A knock sensor, comprising:
   a sleeve having a first threaded portion and a second unthreaded portion;
   a piezoelectric transducer disposed about said sleeve proximate said unthreaded portion, said piezoelectric transducer being insulated from said sleeve and in electrical communication with a first terminal and a second terminal; and,
   a combination seismic mass and nut having a third inner threaded portion configured to engage said first threaded portion of said sleeve to preload said piezoelectric transducer and to provide a mass to the knock sensor, said combination seismic mass and nut further including an inner recessed portion proximate said sleeve for receiving a portion of an inner insulator disposed between said sleeve and said recessed portion.

2. The knock sensor as in claim 1, wherein said combination seismic mass and nut comprises features configured to engage a tool adapted for applying a torque to said combination seismic mass and nut.

3. The knock sensor as in claim 1, wherein said first terminal is disposed between said piezoelectric transducer and a lower insulator at one end of said piezoelectric transducer and said second terminal is disposed between said piezoelectric transducer and upper insulator at another end of said piezoelectric transducer, wherein said upper insulator and said lower insulator insulate said piezoelectric transducer from said sleeve.

4. The knock sensor as in claim 3, wherein said first terminal and said second terminal are adapted to provide an electrical signal of said piezoelectric transducer.

5. The knock sensor as in claim 3, wherein said first terminal, said piezoelectric transducer, said lower insulator, said second terminal and said upper insulator each have an inner opening larger than an exterior circumference of a cylinder portion of said sleeve, wherein said first terminal, said piezoelectric transducer, said lower insulator, said second terminal and said upper insulator are positioned to define a gap between said exterior circumference of said cylinder portion and said first terminal, said piezoelectric transducer, said lower insulator, said second terminal and said upper insulator.

6. The knock sensor as in claim 5, wherein said combination seismic mass and nut comprises features configured to engage a tool adapted for applying a torque to said combination seismic mass and nut.

7. A knock sensor adapted to provide a signal to an engine control module of an engine, the signal corresponding to a knock vibration of the engine, the knock comprising:
   a sleeve having a first threaded portion and a second unthreaded portion;
   a piezoelectric transducer disposed about said sleeve proximate said unthreaded portion, said piezoelectric transducer being insulated from said sleeve and in electrical communication with a first terminal and a second terminal; and,
   a combination seismic mass and nut having a third inner threaded portion configured to engage said first threaded portion of said sleeve to preload said piezoelectric transducer and to provide a mass to the knock sensor, said combination seismic mass and nut further including an inner recessed portion proximate said sleeve for receiving a portion of an inner insulator disposed between said sleeve and said recessed portion, said first terminal or said second terminal being in electrical communication with the engine control module.

8. The knock sensor as in claim 7, wherein said combination seismic mass and nut comprises features configured to engage a tool adapted for applying a torque to said combination seismic mass and nut.

9. The knock sensor as in claim 7, wherein said first terminal is disposed between said piezoelectric transducer and a lower insulator at one end of said piezoelectric transducer and said second terminal is disposed between said piezoelectric transducer and upper insulator at another end of said piezoelectric transducer, wherein said upper insulator and said lower insulator insulate said piezoelectric transducer from said sleeve.

10. The knock sensor as in claim 9, wherein said first terminal, said piezoelectric transducer, said lower insulator, said second terminal and said upper insulator each have an inner opening larger than an exterior circumference of a cylinder portion of said sleeve, wherein said first terminal, said piezoelectric transducer, said lower insulator, said second terminal and said upper insulator are positioned to define a gap between said exterior circumference of said cylinder portion and said first terminal, said piezoelectric transducer, said lower insulator, said second terminal and said upper insulator.

11. The knock sensor as in claim 10, wherein said combination seismic mass and nut comprises features configured to engage a tool adapted for applying a torque to said combination seismic mass and nut.

12. A knock sensor, comprising:
   a sleeve having a first threaded portion and a second unthreaded portion;
   a piezoelectric transducer disposed about said sleeve proximate said unthreaded portion, said piezoelectric transducer being insulated from said sleeve and in electrical communication with a first terminal and a second terminal;
   a combination seismic mass and nut having a third inner threaded portion configured to engage said first threaded portion of said sleeve to preload said piezoelectric transducer and to provide a mass to the knock sensor, said combination seismic mass and nut further including an inner recessed portion proximate said sleeve for receiving a portion of an inner insulator disposed between said sleeve and said recessed portion; and,
   a plastic coating disposed on an exterior surface of said piezoelectric transducer and an exterior surface of said combination seismic mass and nut.

13. The knock sensor as in claim 12, wherein said inner insulator is further disposed between said piezoelectric transducer and said sleeve.

14. The knock sensor as in claim 12, wherein said combination seismic mass and nut comprises features configured to engage a tool adapted for applying a torque to said combination seismic mass and nut.

* * * * *